United States Patent
Oscarsson (10) Patent No.: US 7,677,339 B2
(45) Date of Patent: Mar. 16, 2010

(54) VEHICLE SUSPENSION ARRANGEMENT

(75) Inventor: Christian Oscarsson, Myggenäs (SE)

(73) Assignee: Volvo Lastvagnar AB, Gothenburg (SE)

( * ) Notice: Subject to any disclaimer, the term of this patent is extended or adjusted under 35 U.S.C. 154(b) by 352 days.

(21) Appl. No.: 11/813,229

(22) PCT Filed: Mar. 1, 2006

(86) PCT No.: PCT/SE2006/000268

§ 371 (c)(1),
(2), (4) Date: Jul. 2, 2007

(87) PCT Pub. No.: WO2006/093458

PCT Pub. Date: Sep. 8, 2006

(65) Prior Publication Data

US 2007/0290461 A1   Dec. 20, 2007

(30) Foreign Application Priority Data

Mar. 2, 2005   (SE) .................................... 0500485

(51) Int. Cl.
    *B62D 61/12* (2006.01)
(52) U.S. Cl. ............. 180/24.02; 180/209; 280/124.157; 280/124.16; 280/86.5; 280/6.159; 280/5.514
(58) Field of Classification Search ............. 180/24.02, 180/209; 280/124.157, 124.16, 124.161, 280/86.5, 6.159, 6.157, 6.156, 5.514; 414/457
See application file for complete search history.

(56) References Cited

U.S. PATENT DOCUMENTS

| | | | |
|---|---|---|---|
| 3,201,141 A * | 8/1965 | Bernstein et al. ............ 280/683 |
| 4,284,156 A | 8/1981 | Carstensen et al. |
| 4,700,968 A | 10/1987 | Cherry |
| 4,854,409 A | 8/1989 | Hillebrand et al. |
| 6,308,793 B1 * | 10/2001 | Eberling ................... 180/24.02 |
| 2003/0151221 A1 * | 8/2003 | Kuhn et al. ................. 280/86.5 |
| 2004/0051261 A1 * | 3/2004 | Yakimishyn ............. 280/5.514 |
| 2006/0170168 A1 * | 8/2006 | Rotz et al. ............... 280/5.501 |

FOREIGN PATENT DOCUMENTS

| | | | |
|---|---|---|---|
| EP | 0120332 A1 | | 10/1984 |
| EP | 0 284 572 | * | 9/1988 |
| EP | 0352426 A3 | | 1/1990 |
| GB | 2387359 A | | 10/2003 |

OTHER PUBLICATIONS

International Search Report for corresponding International Application PCT/SE2006/000268.

* cited by examiner

*Primary Examiner*—Ruth Ilan
(74) *Attorney, Agent, or Firm*—WRB-IP LLP (57) ABSTRACT

An arrangement for a suspension for a load carrying vehicle is provided. The suspension is provided with air springs and comprises at least one front axle and at least two rear axles, and each rear axle is provided with at least one pair of corresponding suspension air springs and at least one air spring is provided for lifting one of the rear axles. The suspension air springs for at least the rearmost axle is connected to the air spring for lifting one of the rear axles by a conduit for compressed air, which conduit is provided with a controllable valve, whereby the controllable valve is arranged to open during a vehicle loading process. A vehicle provided with the arrangement, and a method for carrying out a loading operation using the arrangement, are also described.

13 Claims, 6 Drawing Sheets

VEHICLE SUSPENSION ARRANGEMENT

BACKGROUND AND SUMMARY

The invention relates to apparatus for pressurizing the rear suspension of a vehicle provided with air springs, when one end of a container or similar is lifted onto the rear-end of the vehicle by a load handling system of the hook-lift type.

There are many known designs of vehicles with load handling systems of a variety of different hook-lift types. In one known arrangement, a commercial vehicle has a load handling system which is arranged to load and unload over the rear end of the vehicle chassis. The most demanding phase of the loading operation arises during the first part of the loading when the front end of a container, a flatrack or a similar load carrier is being lifted up over the rear end of the vehicle to make initial contact with the rollers or similar guide means which will support and guide the container during the rest of the loading movement.

During the initial phase of the loading, the air springs of at least the rearmost axle may be compressed to the extent that they reach the load limit and contacts their bump stops. This can be caused by the driver starting the loading before the air springs in the suspension have had time to build up a sufficient pressure to support the sudden increase in load. This is a particular problem if the vehicle is unloaded, in which case both the pressure in the air springs and the spring stiffness are relatively low. In this case, the filling of the air springs will not begin until a signal is transmitted from sensors monitoring a change in height of the vehicle chassis. This process will usually be too slow to allow the air springs to be pressurized to take the load.

Also, unknown to the driver, the container itself may be too heavy for the vehicle suspension. If an insufficiently pressurized suspension is subjected to an overload condition, this may cause buckling of parts of the air springs and even deformation of the rear end of the vehicle chassis.

One solution to this problem is to provide the vehicle with support legs that may be deployed by hydraulic cylinders. Support leg of this type will take the load but requires a separate hydraulic system, which adds to the weight, complexity and cost of the vehicle. A further problem with such legs is that the loading of the vehicle will be more time consuming, as the driver must first ensure that the ground below the vehicle is stable, then deploy the legs, and finally retract them after a completed loading operation.

It is desirable to provide an improved arrangement for pressurizing the rear air springs of a vehicle during operation of a load handling system of the hook-lift type, which arrangement assists the driver in avoiding the above problems.

In the text below, the term "air spring" is intended to encompass all types of pneumatic springs comprising a resilient, elastic or similar member used in a vehicle suspension. The axle to be lifted is preferably a so-called trailing axle that is not driven. However, the invention may be adapted to other types of axles in a commercial vehicle.

In addition, air springs are connected to a source of compressed air via one or more controllable valves, whereby the air springs may be pressurized or vented by means of said valves. However, the means for controlling the pneumatic pressure in the air spring or any valves for controlling auxiliary devices will not be described in detail. As these components are not part of the inventive idea, they will only be discussed briefly in the text and shown schematically in the drawings.

The An aspect of the invention relates to an arrangement for a vehicle suspension comprising air springs, which vehicle comprises at least one front axle and at least two rear axles. In the text below, aspects of the invention is are mainly described in relation to a vehicle having a load handling system of the hook-lift type, where the invention is intended for assisting pressurization of said air springs during loading of a freight container onto a rear end of the vehicle by the load handling system. However, aspects of the invention may also be applied to other type of load handling vehicles, such as dump trucks, wherein the suspension may be subjected to a sudden increase in load that in some cases may cause damage to the vehicle and/or the vehicle suspension.

Commercial or construction vehicles suitable for application of aspects of the invention are provided with means for lifting at least one of the rear axles of the vehicle. The vehicle may have a plurality of rear axles having axle members which are in the form of cross-members and support the chassis of the vehicle by way of corresponding pairs of pneumatic suspension air springs supplied from a compressed air source. The vehicle may comprise a lifting assembly located in each, adjacent both or in between a corresponding pair of air springs on the axle to be lifted. The lifting assembly is at least one air spring expansible by the effect of the pressure of the compressed air source, such as a compressor or an accumulator and suitable valves to maintain said axle in the raised position when its suspension air springs are load-free.

An aspect of the invention relates to an arrangement for a suspension for a load carrying vehicle, which suspension is provided with air springs and comprises at least one front axle and at least two rear axles, and where each rear axle is provided with at least one pair of corresponding suspension air springs and at least one air spring is provided for lifting one of said rear axles.

The suspension air springs for at least the rearmost axle is connected to the air spring for lifting one of said rear axles by a conduit for compressed air, which conduit is provided with a controllable valve, whereby the controllable valve is arranged to open during a vehicle loading process.

For a vehicle with two rear axles, the axle to be lifted is a non-driven axle and may be either the forward or the rearward axle. The invention can also by applied to vehicles with three rear axles, wherein at least one non-driven axle may be lifted. At least one air spring may be used for lifting each of said non-driven rear axles. As stated above, the suspension air springs of at least the rearmost axle is connected to the lifting air spring. If two separate air springs are used for lifting an axle, each lifting air spring may be connected to a separate suspension air spring via separate, but simultaneously actuated controllable valves. Similarly, for a vehicle with three rear axles with a single driving axle, two separate air springs may be used for lifting one axle each. Each lifting air spring may be connected to the suspension air springs of separate axles via separate, but simultaneously actuated controllable valves.

The lifting air spring may be arranged to be pressurized prior to the vehicle loading process. For a vehicle with a hook-lift load handling system, pressurizing of the lifting air spring can be actuated by the driver as the vehicle is being maneuvered into position for loading a container or similar. The suspension air springs for the axle to be lifted by said lifting air spring is arranged to be pressurized to balance the pressure in the lifting air spring, in order to prevent said axle from being lifted. For instance, if the a lifting air spring is pressurized to the supply pressure of the pneumatic system of the vehicle, for instance 12 bar, the suspension air spring may be pressurized to at least maintain ground contact, for instance 2 bar. These pressures may vary depending on the type and the size of the vehicle, the available supply pressure from a compressor or an accumulator, the relative size of the lifting and suspension air springs, and other parameters.

If the vehicle travels unloaded, with a non-driven axle in a lifted position, then the lifting cylinder is already pressurized to the supply pressure of the pneumatic system. Actuation of the arrangement by the driver will then cause the suspension air spring to be pressurized to lower the lifted axle in order to at least achieve ground contact.

When the above-mentioned controllable valve is opened during a vehicle loading process, the pressurized air in the one or more lifting air springs will be supplied to the suspension air springs of at least the rearmost axle through said conduit. This equalization of pressure between the lifting and suspension air springs causes a relatively rapid increase of the pressure in the suspension air springs. In this way, the rear suspension of the vehicle may support a sudden increase in load during an initial period of a loading process, until additional pressure can be provided by the compressed air supply of the vehicle.

According to a further aspect, the suspension air springs may comprise a pot made of rigid, pressure-resistant material, such as steel or a suitable plastic material, and a resilient bellows closed by a substantially flat plate at one end and at its opposite end fitted onto an open end of the pot, made of e.g. nylon-reinforced rubber. The bellows is in pneumatic connection with the pot and is connected to a source of compressed air via at least one controllable valve. An air spring of this type may be provided with a pot having an air shut-off valve in a partition wall arranged to shut off the open end facing the bellows, creating a separate pressure tight chamber inside the pot. The volume of this chamber may be as much as half of the total volume of the air spring.

The controllable valve may comprise a seat or poppet valve a sliding valve or a rotary valve, which valve may be controlled pneumatically or electrically.

In the case of a poppet valve, the poppet may be raised and lowered by means of a piston in a separate cylinder inside the pot, arranged to shut off the air inside the pot, in a lowered position, while air is being vented from or supplied to the bellows, and to equalize pressures between the pot and the bellows, in a raised position, when air is neither vented from or supplied to the bellows. The opening and closing of the poppet is controlled by a pressure supplied to the cylinder when it is desired to open the poppet valve.

In this aspect, the above arrangement may be used in combination with the air spring for lifting one of said rear axles. For instance, when a rear axle is to be lifted the pressure supplied to the poppet valve is shut off, causing the poppet valve to close and retain the current air pressure. This pressure may in some cases be as much as 8 bar. To lift the axle, the volume contained within the bellows is vented to the atmosphere as the lifting air spring is pressurized.

During a subsequent loading operation, as described above, the controllable valve between the one or more lifting air springs and the suspension air springs of at least the rearmost axle is opened and the pressurized air in the lifting air springs will be supplied to the suspension air springs through said conduit. This first equalization of pressure between the lifting and suspension air springs causes an initial increase of the pressure in the suspension air springs. Subsequently, pressurized air is supplied to the cylinder to open the poppet valve. This causes a further increase in pressure during a second equalization of pressure between the bellows and the pot. Depending on the pressure in the volume contained in the pot, it may be necessary to close the controllable valve between the suspension and lifting springs before the poppet valve is opened to maintain the pressure in the suspension air spring. Alternatively, a non-return valve may be provided in the conduit. This provides the rear suspension of the vehicle with additional pressure for supporting a sudden increase in load during an initial period of a loading process, until additional pressure can be provided by the compressed air supply of the vehicle.

According to a further aspect, the vehicle may be provided with a signal generating means, arranged to generate a signal when a vehicle loading process is in progress, whereby the signal is arranged to open said controllable valve. According to one aspect, the signal generating means may be a switch controllable by an operator. For instance, this may be the switch used to initialize the loading process, whereby a pneumatic or hydraulic means are moved to load the vehicle.

According to a further aspect, the signal generating means is a load sensor for indicating that the vehicle is subjected to a load exceeding a predetermined value. This may be a weight sensor or a strain gauge monitoring the current load applied to one or more positions of the vehicle or to a load carrying platform thereon.

According to a further alternative, the signal generating means is a sensor for indicating that the vehicle is subjected to a load causing a predetermined compression of at least the rear most suspension air spring. This may be a height sensor measuring the relative distance between a fixed position on the vehicle chassis and a suitable position on a vehicle axle. Sensors of this type are may be available on many types of commercial vehicles, whereby an existing signal output may be used.

An aspect of the invention further relates to a method for assisting pressurization of said air springs for loading of a freight container onto a rear end of the vehicle by the load handling system of the hook-lift type, which vehicle comprises at least two rear axles, each axle provided with at least one pair of corresponding suspension air springs for each rear axle and at least one air spring for lifting one of said rear axles. The method may involve the steps of; -pressurizing the air spring for lifting one of said rear axles prior to actuation of the load handling system, pressurizing the suspension air springs of the axle to be lifted to prevent said lifting air spring from lifting said axle;

generating a signal indicating that a vehicle loading process is in progress;

actuating a valve for connecting the lifting air spring to the suspension air springs of at least the rearmost axle in response to the signal.

According to a further aspect, generation of the signal may be achieved by a sensor indicating that the rear part of the vehicle is subjected to a load. According to a further aspect, generation of the signal may occur when the load handling system is actuated to load the vehicle. According to a further aspect, generation of said signal may occur when a sensor indicates that the vehicle is subjected to a load causing a predetermined compression of at least the rear most suspension air spring.

An aspect of the invention further relates to a vehicle provided with an arrangement according to one or more of the above embodiments.

BRIEF DESCRIPTION OF DRAWINGS

In the following text, the invention will be described in detail with reference to the attached drawings. These drawings are used for illustration only and do not in any way limit the scope of the invention. In the drawings.

DETAILED DESCRIPTION

Figure 1:
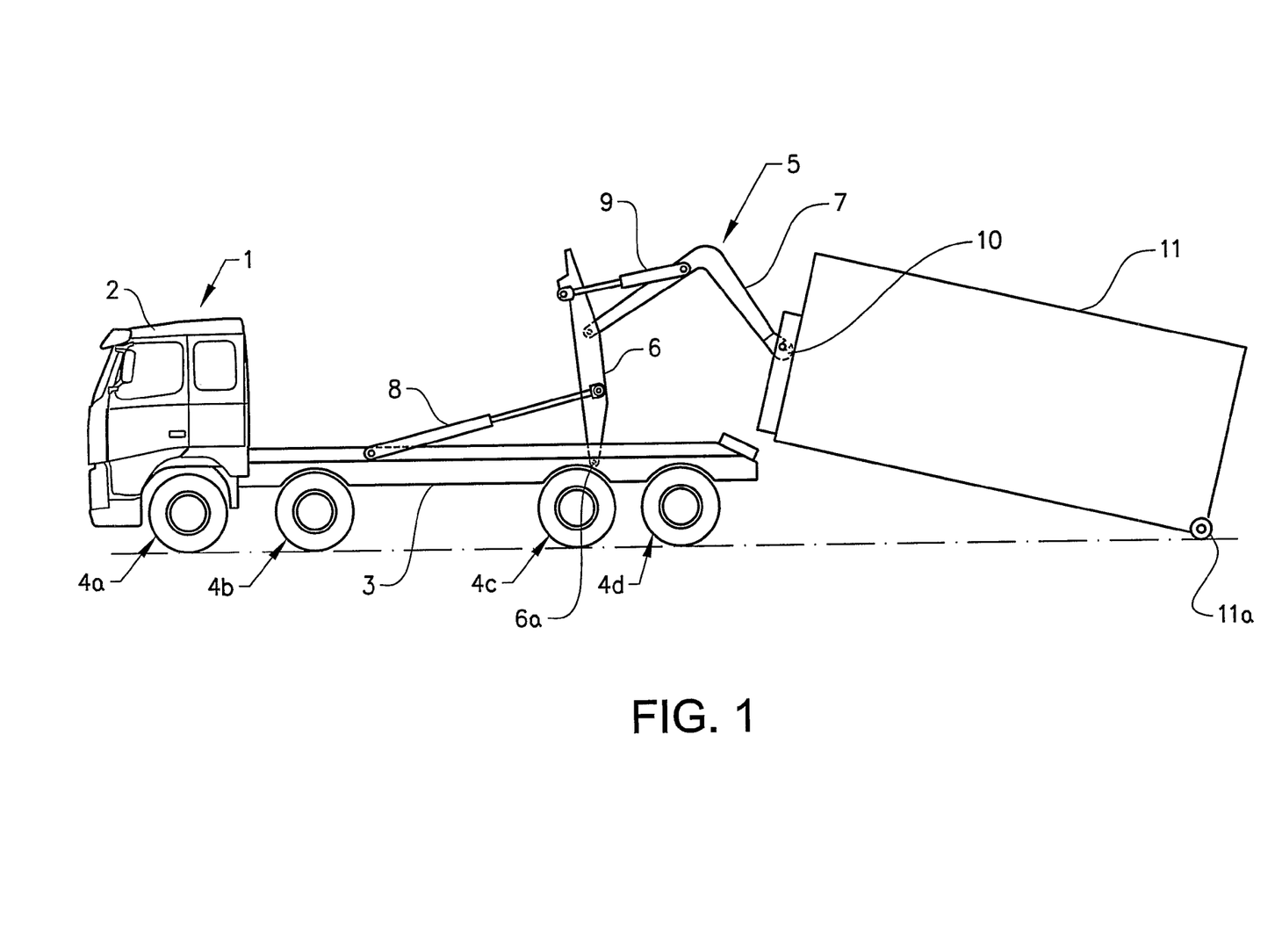
FIG. 1 shows a vehicle according to one embodiment of the invention during an initial stage of a loading process.

FIG. 1 shows a vehicle 1 provided with an arrangement for assisting pressurization of a number of vehicle suspension air springs according to the invention. The vehicle 1 is provided with a cab 2 mounted on a chassis 3 and has two front and two rear wheel axles 4a-4d. In this embodiment, the forward rear axle 4c is a driven axle and the rearward rear axle 4d is a trailing axle. The trailing rear axle 4d is provided with means for lifting said axle when the vehicle is travelling unloaded. The means for lifting the trailing axle 4d will be described in further detail below.

The vehicle is provided with a load handling system 5 of the hook-lift type, comprising a first and a second lever 6, 7 controlled by a first and a second hydraulic cylinder 8, 9, respectively. The first lever 6 and first hydraulic cylinder 8 are mounted on the chassis 3, while a first end of the second lever 7 and the second hydraulic cylinder 9 are mounted on the first lever 6. A second end of the second lever is provided with a hook 10 for attachment to a load carrying device, such as a container 11. The hook 10 at the end of the second lever 7 follows two successive curved paths of movement when lifting a load onto the vehicle. FIG. 1 shows an initial stage of the loading process, where the load handling system 5 has been attached to and lifted the end of the container 11 adjacent to the rear of the vehicle a predetermined distance off the ground. In this position, the weight of the container 11 is supported partly by the ground, at the rear corner of the container 11a, and partly by the vehicle 1, at the attachment point 6a of the first lever 6 adjacent the driven axle 4c. As can be seen from FIG. 1, the load supported by the vehicle at this stage is distributed over multiple axles.

Depending on the weight of the container, the arrangement for assisting pressurization of said air springs may be actuated at this time. The actuation is dependent on the output of a sensor (not shown), in this case a height sensor for measuring the relative distance between a fixed position on the vehicle chassis and a suitable position on a vehicle axle.

Figure 2:
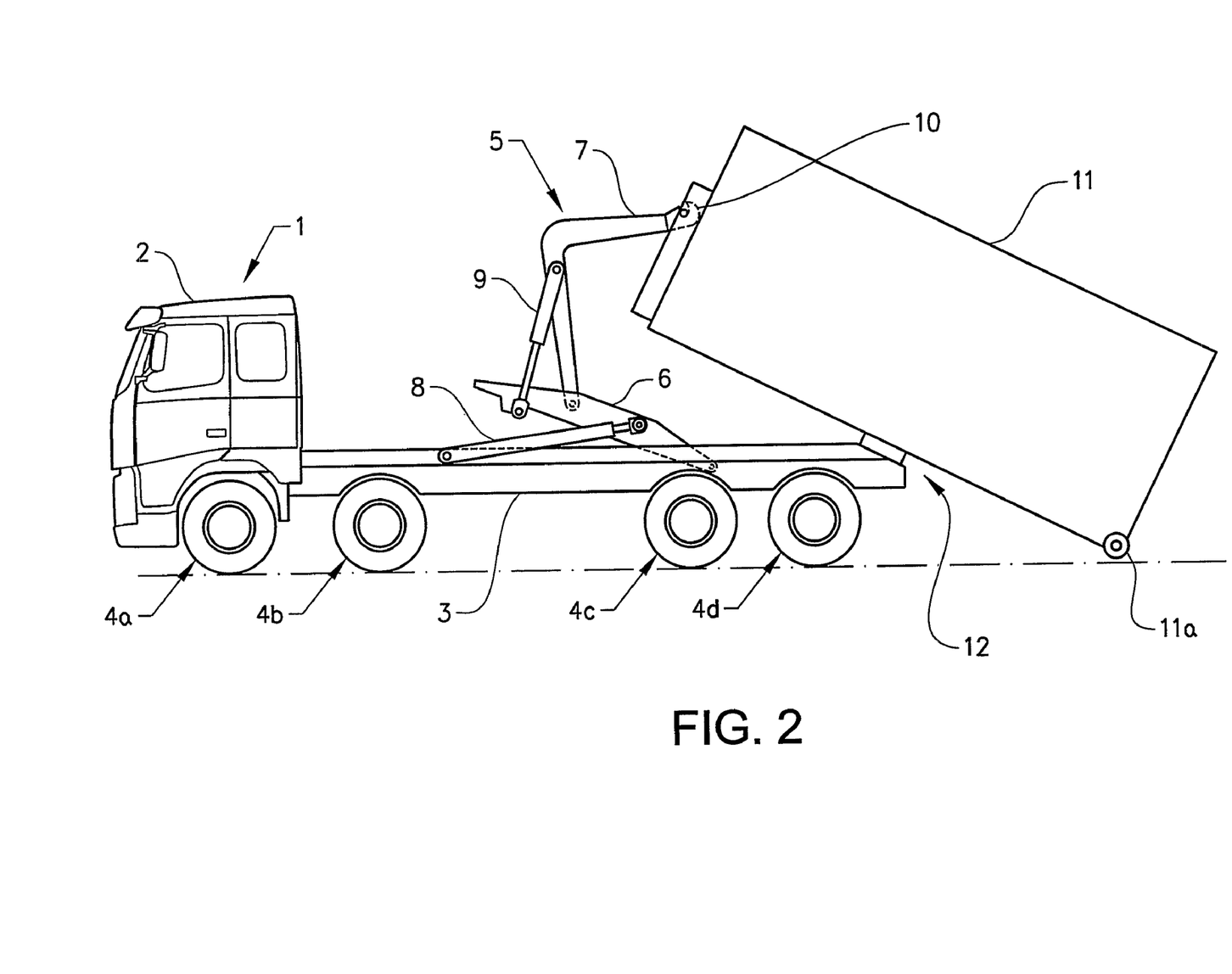
FIG. 2 shows an intermediate stage of the loading process of FIG. 1.

FIG. 2 shows an intermediate stage of the loading process, where the load handling system 5 has lifted the end of the container 11 adjacent to the rear of the vehicle a predetermined distance over and above the chassis in the direction of the cab 2. In this position, the weight of the container 11 is supported entirely by the vehicle 1, at the rear end 12 of the chassis 3. As can be seen from FIG. 2, a major part of the load supported by the vehicle at this stage is taken up by the rear trailing axle 4d.

In order to prevent the suspension air springs of the trailing axle 4d from being compressed to the extent that they reach their load limit and contact their bumpstops (not shown), the arrangement for assisting pressurization of said suspension air springs is actuated. This occurs when the rear end of the vehicle is subjected to a load that corresponds to a predetermined output from said height sensor.

The output signal level that actuates the arrangement according to the invention can be set at the same level as the one that actuates a compressor or accumulator in the vehicle pneumatic system to increase the pressure in the suspension air springs. However, it can also be set to actuate the arrangement at a lower level, prior to the actuation of the pneumatic system.

Figure 3:
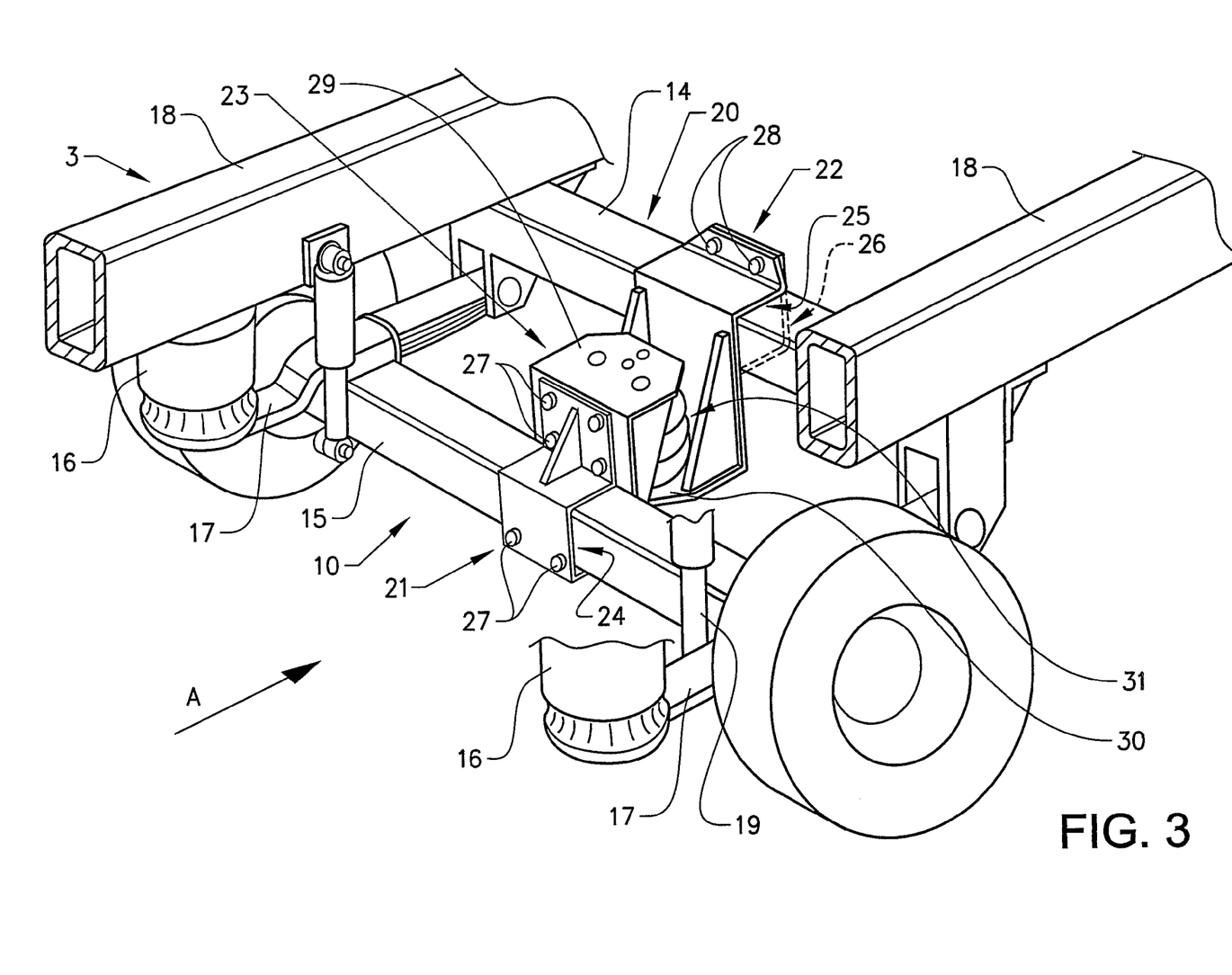
FIG. 3 shows a vehicle suspension arrangement provided with a lifting assembly for lifting a rear axle of the vehicle in FIG. 1.

FIG. 3 shows a vehicle suspension arrangement provided with a lifting assembly for lifting the rear axle 4d of the vehicle in FIG. 1. In FIG. 3, the direction of travel is indicated by the arrow A. As can be seen from the figure, a cross-member 14 of the chassis 3 and a cross-member or body 15 of the trailing axle 4d are composed of profiles of square cross-section.

The suspension air springs 16 by way of which the body 15 supports the chassis 3 are interposed between arms 17 fastened to the body 15 and a pair of parallel beams 18 making up the frame 3. The body 15 and the beams 18 are moreover interconnected by shock absorbers 19.

The lifting assembly 20 comprises a pair of brackets 21 and 22, respectively attached to the body 15 of the liftable axle 4d and to the cross-member 14 of the chassis 3, in the median portion of these elements. Preferably, as shown, the two brackets 21 and 22 are identical and are inversely positioned relative to each other. Each bracket has a pair of elements, 23, 24 and 25, 26, respectively, made of heavy-gauge sheet metal, angled as shown and reinforced by angle-pieces (not referenced). As can be seen, the two elements 23 and 24 are shaped so as to embrace the body 15 in the manner of clamps and are bolted together by clamping bolts 27. In a similar manner, the two elements 25, 26 are shaped so as to embrace the cross-member 14 in the manner of clamps and are bolted together by clamping bolts 28.

The location of the lifting assembly 20 on the median portion of axle 4d makes it possible to achieve a balanced lifting of this axle by means of a 20 single assembly.

The element 23 of the bracket 21 comprises an upper shelf portion 29 and the element 25 of the bracket 22 comprises a lower shelf portion 30. These shelf portions 29 and 30 are located one above the other and between them there is interposed an air spring 31. Preferably, the air spring 31 comprises a bellows of a resilient material. The base of air spring 31 is fastened to the lower clamp element 30. The lower clamp element 30 is provided with a connector (not shown) for linking the air spring 31 to a pneumatic circuit.

Figure 4:
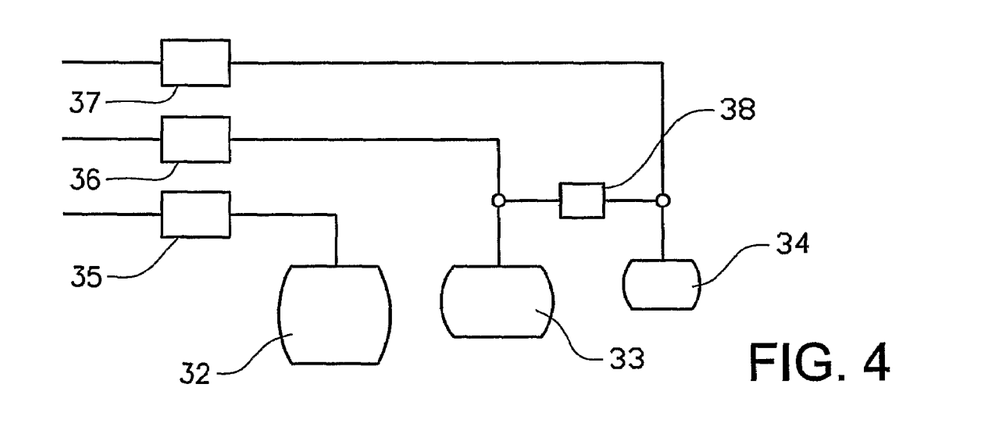
FIG. 4 shows a schematic diagram for a pneumatic circuit controlling an arrangement according to a preferred embodiment of the invention.

FIG. 4 shows a schematic diagram for a pneumatic circuit for controlling an arrangement according to a preferred embodiment of the invention. The diagram shows suspension air springs 32, 33 for a driven and a trailing rear axle respectively, and lifting air spring 34 for lifting the trailing rear axle. Each air spring 32, 33, 34 are supplied with pressurized air from a common source, such as a compressor (not shown). Compressed air is supplied to or vented from each air spring 32, 33, 34 by means individual controllable valves 35, 36, 37, which are controlled by a central control unit (not shown). The suspension air spring 33 of the trailing axle is connected to the lifting air spring 34 by a conduit provided with a further controllable valve 38.

Figure 5:
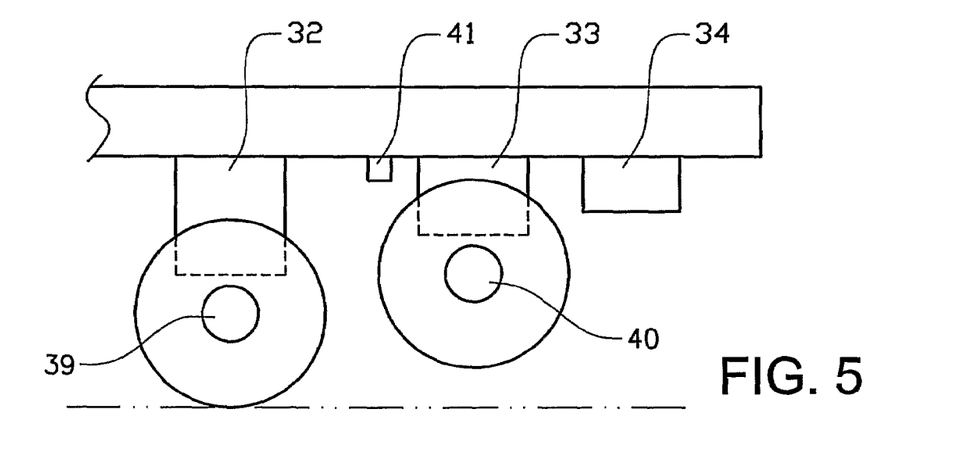
FIG. 5 shows a schematic illustration of a vehicle provided with an air spring arrangement as described in FIG. 4.
Figure 6:
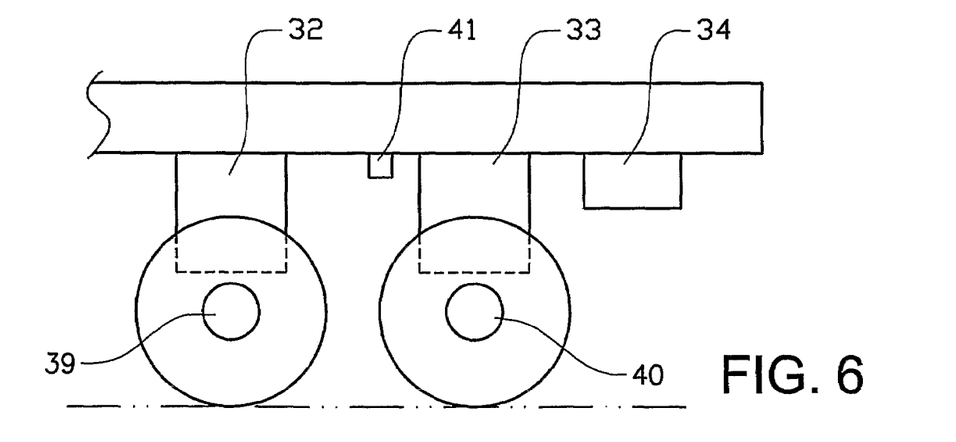
FIG. 6 shows a schematic illustration of a vehicle provided with an alternative air spring arrangement.

FIG. 5 shows a schematic illustration of a vehicle provided with a pneumatic circuit as described in FIG. 4. In this figure the vehicle is unloaded, whereby the weight of the rear of the vehicle is carried by the suspension air spring 32 connected to the driven axle 39. The suspension air spring 33 connected to the trailing axle 40 is vented to the atmosphere and the axle is held in its lifted position by the lifting air spring 34. According to the invention, before the vehicle is to be loaded, the driver actuates the arrangement whereby the control valve 36 (see FIG. 4) opens to supply the suspension air spring 33 of the trailing axle with sufficient air to balance the pressure in the lifting air spring 34 and move the wheels of the trailing axle downwards into contact with the ground, as shown in FIG. 6. In the latter example, the pressure in the lifting air spring 34 is equal to a supply pressure of 12 bar. To balance this pressure, the suspension air spring 33 is pressurized to 2 bar.

When the vehicle is being loaded, the control unit receives a signal from a sensor 41 monitoring deviation from a predetermined vehicle ride height. When a predetermined deviation is recorded, this indicates that the load on the rearmost axle on the vehicle has exceeded a predetermined limit. The control unit will then open the control valve 38, connecting the lifting air spring 34 to the suspension air spring 33. The pressure in these air springs 33, 34 will then equalize, causing a rise in pressure from 2 bar to about 4 bar in the suspension air spring 33. At the same time the control unit initiates pressurization of both rear suspension air springs 32, 33 in order to return the chassis to its predetermined ride height. In this way an overload of at least the rearmost suspension air spring can be avoided.

FIG. 6 can also illustrate an alternative embodiment, where the lifting air spring 34 is not in use prior to a loading operation. In this case, the driver actuates the arrangement, whereby the control valves 36 and 37 (see FIG. 4) opens to supply both the suspension air spring 33 of the trailing axle and the lifting air spring 34 with pressurized air. The supplied pressure is sufficient to balance the pressure in the suspension air spring 33 and the pressure in the lifting air spring 34, in order to maintain the wheels of the trailing axle in contact with the ground. During a loading operation, the pressure in the lifting air spring 34 and the suspension air spring 33 can be equalized, as described above.

Figure 7:
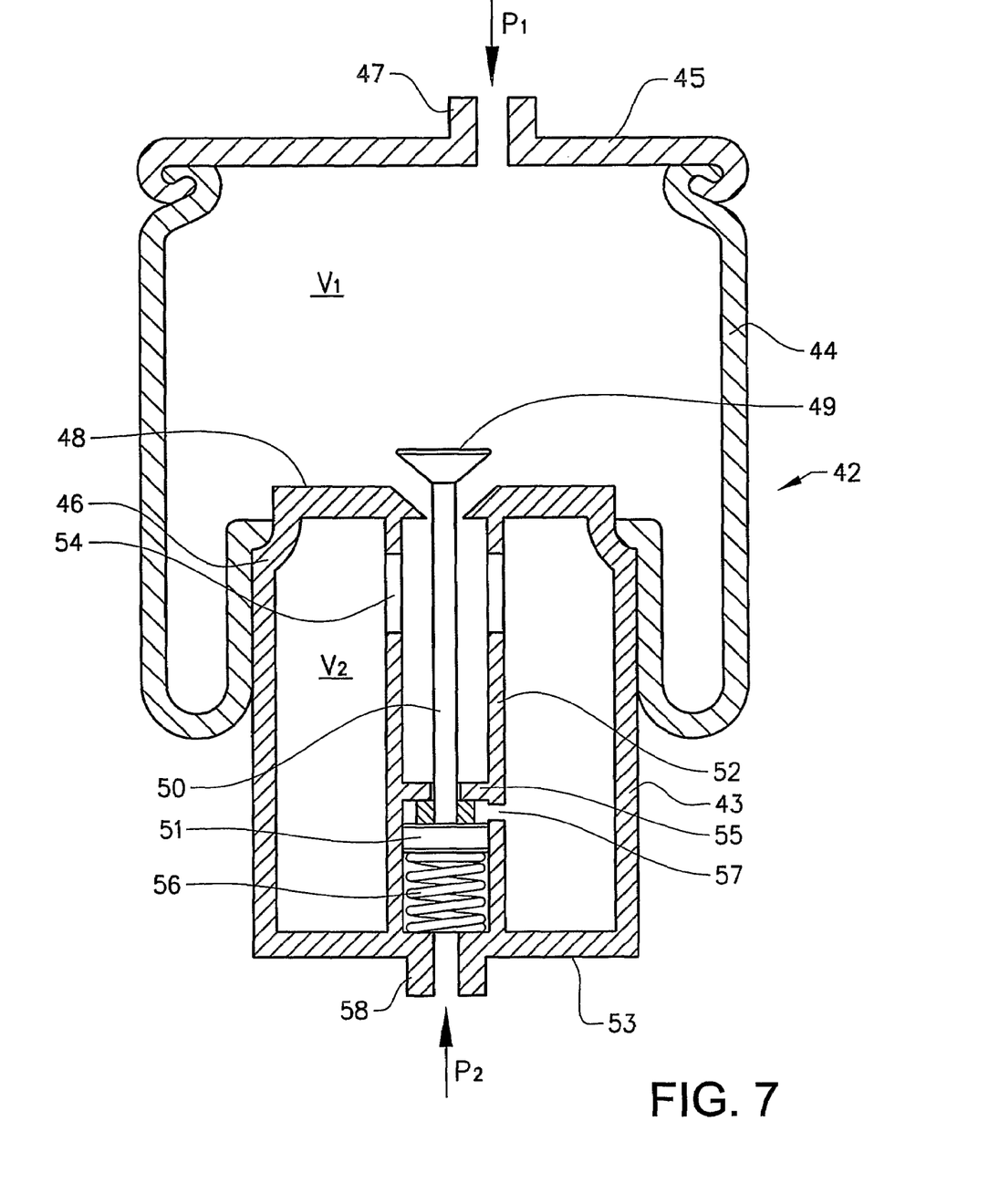
FIG. 7 shows a cross section of a suspension air spring arrangement according to a further preferred embodiment of the invention.

FIG. 7 shows, in a vertical cross-section, an example of an air spring according to a further embodiment of the invention. In the figure, a suspension air spring 42 comprises a pot 43 made of metal and a resilient bellows 44. The bellows 44 is closed by a substantially flat plate 45 at one end and is fitted onto an end 46 of the pot 43 at its opposite end. In this case the bellows 44 is made of nylon-reinforced rubber. The bellows 44 encloses a first, variable volume V1, while the pot 43 encloses a second, substantially constant volume $V_2$. The volume V1 enclosed by the bellows 44 is in pneumatic connection with the volume $V_2$ enclosed by the pot 43 and is connected to a source of compressed air Pi via a controllable valve (see FIG. 4) through an opening 47 in the flat plate 45. A partition wall 48 located at said end 46 of the pot 43 is provided with a controllable poppet valve 49. The poppet valve 49 is arranged to shut off the volume $V_2$ in the pot 43 from the volume V1 the bellows 44, creating a separate pressure tight chamber inside the pot 43. In this example, the volume $V_2$ of this chamber is approximately the same as the volume V1 of the bellows when the vehicle is running empty.

The poppet valve 49 is part of a valve arrangement comprising a stem 50 that is attached to the poppet valve at one end and provided with a piston 51 attached to its opposite end. The valve arrangement is located in a cylinder 52 extending between the partition wall 48 and an opposite, second end wall 53 of the pot 43. The cylinder wall has apertures 54 adjacent the partition wall 48, so that air may flow between the first and second volumes V1, $V_2$.

The piston 51 is enclosed by the cylinder 52, the second end wall 53 and a partition wall 55 inside the cylinder. A compression spring 56 acting on the piston 51 is arranged to apply a spring load thereon, maintaining the poppet valve 49 in its open position. The position of the poppet valve 49 is also controlled by an air pressure $P_2$ supplied through an opening 58 in the second end wall 53, which pressure acts on the piston 51 on the same side as the spring 56. The side of the piston 51 opposite the spring 56 is subjected to air pressure from the second volume $V_2$ through an opening 57 in the cylinder. When the poppet valve 49 is in its upper position, as shown in the figure, the aperture 47 is open and the air inside the pot 43 as well as that inside the bellows 44 has the same pressure, due to the apertures 54 in the cylinder 52 surrounding the opening 47 on the lower side of the partition wall.

In normal operation, when the pressure $P_2$ drops to zero through the action of a shut-off valve (not shown) the poppet valve 49 will move downwards, as the pressure inside the pot 43, which is the same as the pressure inside the bellows 44, will act on the upper side of the piston 51 through the opening 57. This force acting on the upper side of the piston 51 will be greater than the force of the spring 56 acting in the opposite direction. When the poppet valve 13 is closed, the pressure inside the bellows will also add to the downward force on the valve and thus contribute to a correct closing thereof. When the pressure $P_2$ is introduced again, the valve will be opened, as the pressure $P_2$ is higher than, or as high as, the pressure inside the bellows, and as the bottom surface area of the piston 17 is larger than the top area of the valve poppet 13. A source of compressed air connected to the opening 47 in the flat plate 45 is shown in the figure, can be connected to a level control valve (not shown) for injecting and discharging air into/from the bellows 44.

As will be apparent from the figure, the cylinder 52 in the pot 43 is made integrally with, or fixedly secured to, the bottom of the pot 43 and the partition wall 48. The cylinder 52 will thus provide a reinforcement against the vertical force that will be applied onto the pot when the poppet valve 49 is closed and the pressure inside the bellows will act upon the partition wall 48.

As discussed above, the volume of the pot 43 is approximately half of the entire volume of the air spring 42. At pressures around 8 bar, which is commonly used in such air springs, a substantially smaller amount of air will have to be supplied to, or be discharged from, the air spring 42 during lifting or lowering of the vehicle frame 1.

An air spring as described above is suitable for use in an aspect of the invention. As stated above, the controllable valve comprises a poppet valve 49 that is controlled pneumatically. The poppet is raised and lowered by means of a piston 51 in a separate cylinder 52 inside the pot 43. In this way the poppet valve 49 is arranged to shut off the volume $V_2$ of air inside the pot 43 when in its lowered, closed position. Similarly, when the poppet valve 49 is in its raised, open position, air can be vented from or supplied to the bellows 44, and be allowed to flow between the first and second volumes to equalize pressures between the pot 43 and the bellows 44 when air is neither vented from nor supplied to the bellows. The opening and closing of the poppet is controlled by the pressure $P_2$ supplied to the cylinder 52 when it is desired to open the poppet valve 49.

Figure 8:
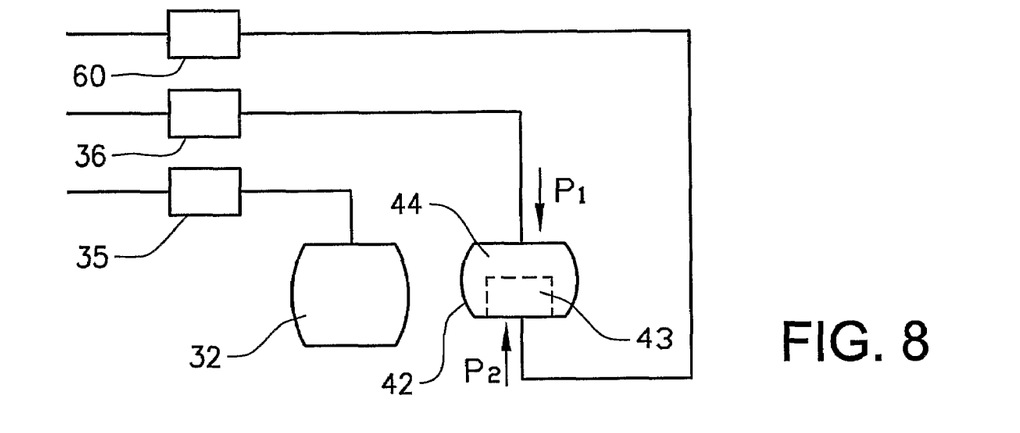
FIG. 8 shows an alternative schematic diagram for a pneumatic circuit controlling a suspension air spring according to FIG. 7.

FIG. 8 shows an alternative schematic diagram for a pneumatic circuit for controlling an arrangement as shown in FIG. 7. In this embodiment, the above arrangement is used in combination with the air spring for supporting one of said rear axles. This arrangement allows the lifting air spring 34 (see FIGS. 5 and 6) to be replaced by the second volume $V_2$ in the pot 43, as shown in FIG. 7. When a rear axle is to be lifted the pressure $P_2$ supplied to the poppet valve in the pot 43 is shut off by closing a controllable valve 60, causing the poppet valve to close and retain the air pressure in the pot 43 of the suspension air spring 42 at that time. This pressure may in some cases be as much as 8 bar and is retained in the pot 43 irrespective of subsequent pressure changes in the bellows 44. To lift the axle, the volume V1 contained within the bellows is then vented to the atmosphere and the axle can be lifted.

During a loading operation a control unit (not shown) receives a signal from a sensor 41 (see FIG. 9) monitoring a deviation from a predetermined vehicle ride height. When a predetermined deviation is recorded, this indicates that the load on the rearmost axle on the vehicle has exceeded a predetermined limit. The control unit will then open the control valve 60, supplying a pressure $P_2$ to the opening 58 in the pot 43. This pressure $P_2$ acts on the piston 51 to open the above-mentioned controllable poppet valve 43 is opened during a vehicle loading process, the pressurized air in the pot 43 will be supplied to the suspension air springs of at least the rearmost axle. This equalization of pressure between the pot 43 and the bellows 44 causes a relatively rapid increase of the pressure in the suspension air spring 42. In this way, the rear suspension of the vehicle may support a sudden increase in load during an initial period of a loading process, until additional pressure can be provided by the compressed air supply Pi of the vehicle. The additional pressure is supplied by opening the control valve 36, which is actuated at the same time as the control valve 60.

Figure 9:
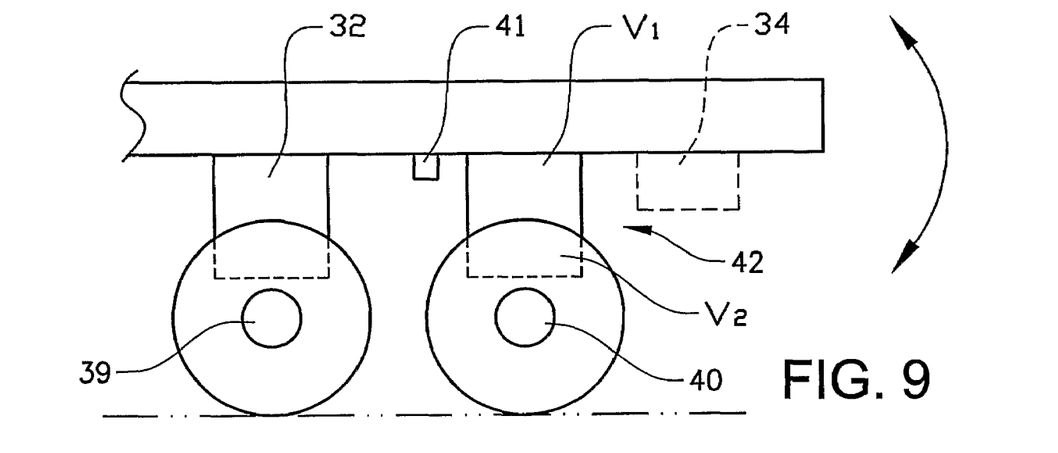
FIG. 9 shows a schematic illustration of a vehicle provided with a suspension air spring according to FIG. 7.

FIG. 9 shows a schematic illustration of a vehicle provided with a suspension air spring as described in connection with FIG. 7 and a pneumatic circuit as described in connection with FIG. 8. During a loading operation, the controllable valve 49 (see FIG. 7) between the first and second volumes V1, V2 in the respective suspension air spring 42 of the rearmost axle 40 is actuated and the pressurized air in the pot 43 will partially pressurize the suspension air springs 42 through the said controllable valve. This equalization of pressure between the pot and the bellows in the suspension air spring causes an initial increase of the pressure in the suspension air springs.

Figure 10:
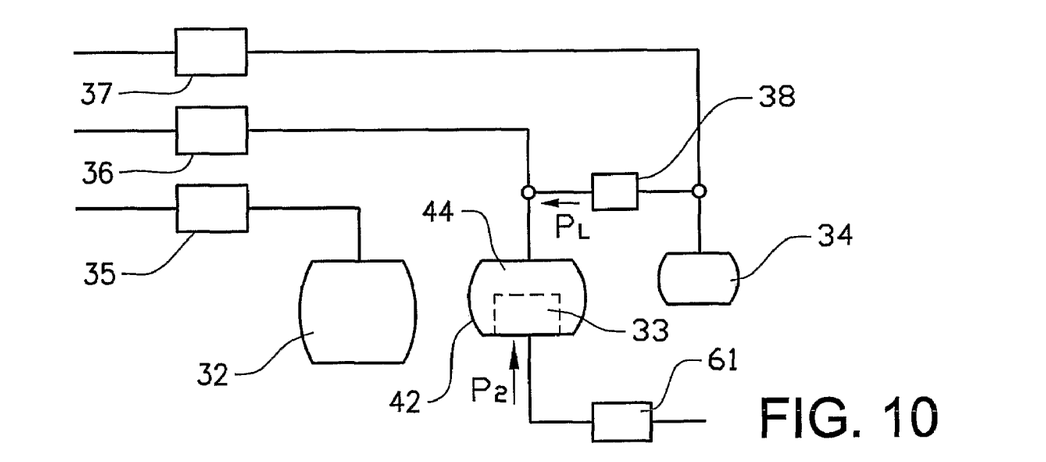
FIG. 10 shows a further alternative schematic diagram for a pneumatic circuit controlling a suspension air spring according to FIG. 7.

FIG. 10 shows a further alternative schematic diagram for a pneumatic circuit for controlling an arrangement as shown in FIG. 7. In this embodiment, the above arrangement is used in combination with the air spring for supporting one of said rear axles and the lifting air spring 34 as described in FIGS. 5 and 6 and indicated in dashed lines in FIG. 9. During a loading operation a control unit (not shown) receives a signal from a sensor monitoring a deviation from a predetermined vehicle ride height. When a predetermined deviation is recorded, this indicates that the load on the rearmost axle on the vehicle has exceeded a predetermined limit. The control unit will then open the control valve 38, connecting pressure PL in the lifting air spring 34 to the suspension air spring 33. The pressure in these air springs 33, 34 will then equalize, causing a rise in pressure from 2 bar to about 4 bar in the suspension air spring 33. This first equalization of pressure between the lifting and suspension air springs causes an initial increase of the pressure in the suspension air springs. A non-return valve is provided in the control valve 38 to maintain the pressure in the suspension air spring.

Subsequently, the control unit will then open the control valve 61, supplying a pressure $P_2$ to the opening 58 in the pot 43 of the air spring 42 to open the poppet valve 49. This causes a further increase in pressure during a second equalization of pressure between the bellows and the pot. This provides the rear suspension of the vehicle with additional pressure for supporting a sudden increase in load during an initial period of a loading process. At the same time the control unit initiates pressurization of both rear suspension air springs 32, 33 in order to return the chassis to its predetermined ride height.

The invention is not limited to the above embodiments, but may be varied freely within the scope of the appended claims.

The invention claimed is:

1. Arrangement for a suspension for a load carrying vehicle, comprising a suspension provided with air springs, the suspension comprising at least one front axle and at least two rear axles, each rear axle being provided with at least one pair of corresponding suspension air springs, and at least one air spring provided for lifting one of the rear axles, wherein the suspension air springs for at least a rearmost axle of the at least two rear axles are connected to the at least one air spring by a conduit for compressed air, the conduit being provided with a controllable valve, the controllable valve being arranged to open during a vehicle loading process.

2. Arrangement according to claim 1, wherein the at least one air spring is arranged to be pressurized prior to the vehicle loading process.

3. Arrangement according to claim 2, wherein suspension air springs for an axle to be lifted by the at least one air spring is arranged to be pressurized to balance pressure in the the at least one air spring, in order to prevent the axle from being lifted.

4. Arrangement according to claim 1, wherein the vehicle is provided with a signal generating means, arranged to generate a signal when a vehicle loading process is in progress, the signal being arranged to open the controllable valve.

5. Arrangement according to claim 4, wherein the signal generating means is a switch controllable by an operator.

6. Arrangement according to claim 4, wherein the signal generating means is a load sensor for indicating that the vehicle is subjected to a load exceeding a predetermined value.

7. Arrangement according to claim 4, wherein the signal generating means is a sensor for indicating that the vehicle is subjected to a load causing a predetermined compression of at least the suspension air springs for the rearmost axle.

8. Arrangement according to claim 1, wherein the arrangement is mounted in a vehicle having a load handling system of the hook-lift type.

9. Vehicle provided with an arrangement according to claim 1.

10. Method for assisting pressurization of the air springs for loading of a freight container onto a rear end of the vehicle by a load handling system of a hook-lift type, which vehicle comprises at least two rear axles, each axle provided with at least one pair of corresponding suspension air springs for each rear axle and at least one air spring for lifting one of the rear axles, comprising the steps of;

pressurizing the air spring for lifting one of the rear axles prior to actuation of the load handling system, pressurizing the suspension air springs of the axle to be lifted to prevent the lifting air spring from lifting the axle;

generating a signal indicating that a vehicle loading process is in progress;

actuating a valve for connecting the lifting air spring to the suspension air springs of at least a rearmost axle of the rear axles in response to the signal.

11. Method according to claim 10, comprising generation of the signal by a sensor indicating that a rear part of the vehicle is subjected to a load.

12. Method according to claim 10, comprising generation of the signal when the load handling system is actuated to load the vehicle.

13. Method according to claim 10, comprising generation of the signal when a sensor indicates that the vehicle is subjected to a load causing a predetermined compression of at least the suspension air springs for the rearmost axle.

* * * * *